United States Patent [19]

Bannister

[11] Patent Number: 4,556,615

[45] Date of Patent: Dec. 3, 1985

[54] SOLID STATE ELECTROCHEMICAL CELL

[75] Inventor: Dennis J. Bannister, Wakefield, England

[73] Assignee: United Kingdom Atomic Energy Authority, London, England

[21] Appl. No.: 675,266

[22] Filed: Nov. 27, 1984

Related U.S. Application Data

[63] Continuation of Ser. No. 482,165, Apr. 5, 1983, abandoned.

[30] Foreign Application Priority Data

Apr. 16, 1982 [GB] United Kingdom ............... 8211145

[51] Int. Cl.4 ............................................. H01M 6/16
[52] U.S. Cl. .................................... 429/192; 429/198
[58] Field of Search ................ 429/191, 192, 198, 199

[56] References Cited

U.S. PATENT DOCUMENTS

| | | | |
|---|---|---|---|
| 3,704,174 | 11/1972 | Berger | 429/192 |
| 4,060,673 | 11/1977 | Dey | 429/192 |
| 4,241,149 | 12/1980 | Lobes et al. | 429/192 X |
| 4,303,748 | 12/1981 | Armand et al. | 429/192 |
| 4,357,401 | 11/1982 | Andre et al. | 429/192 |
| 4,365,009 | 12/1982 | Grimes et al. | 429/192 X |

*Primary Examiner*—Charles F. LeFevour
*Attorney, Agent, or Firm*—Larson and Taylor

[57] ABSTRACT

A solid state electrochemical cell comprises an anode having at least one alkali metal as its active material, a cathode and an electrolyte comprising an anion and a cation comprising at least one electrolytically active alkali metal ion.

The anion is at least partially immobilized by it constituting part of a polymer, chain, e.g. as the poly (methacryloyl-oxy-benzoate) or poly (2-(4-carboxyhexafluorobutanoyl-oxy-)ethylmethacrylate ions, thereby to overcome problems associated with mobile anions. The cation is preferably $Li^+$ and a polymer such as poly (ethylene oxide) may be blended into the electrolyte to improve its mechanical properties.

6 Claims, No Drawings

SOLID STATE ELECTROCHEMICAL CELL

This application is a continuation of application Ser. No. 482,165 filed Apr. 5, 1983 now abandoned.

The invention relates to a solid state electrochemical cell; the cell comprises an anode having at least one alkali metal as its active material, a cathode and an electrolyte comprising an anion and a cation comprising at least one electrolytically active alkali metal ion.

South African Patent Application No. 79/6263 describes an electrochemical cell wherein the electrolyte comprises a solid solution of an ionic compound (e.g. a salt of an alkali metal and a strong acid anion) in a solid plastic polymeric marcomolecular material. Such electrolytes are not, however, pure cation conductors and it is possible that mobility of the anion can lead, in operation of such a cell, to problems such as the formation of undesirable discharge products at the electrodes and compositional changes in the polymer, e.g. in the form of a membrane thereof.

The invention provides a solid state electrochemical cell comprising an anode having at least one alkali metal as its active material, a cathode and an electrolyte comprising an anion and a cation comprising at least one electrolytically active alkali metal ion, wherein the anion constitutes part of the chain of a polymer and is thereby at least partially immobilised.

Immobilisation of the anion in the invention enables the abovementioned problems associated with electrolytes having mobile anions to be overcome. The electrolyte in the invention has been found to have a high ionic conductivity.

Examples of suitable anions are anions having the structures (I) and (II) below.

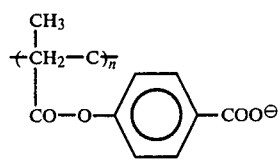

and

where n represents chain lengths and is ~1,000 in both cases.

In each of the above, the anion is part of the chain of a polymer and is therefore immobile.

The anion of the structure (I) above may be made by neutralising poly(methacryloyl-oxy-benzoic acid), referred to hereinafter as PMBA, and the anion of the structure (II) by neutralising poly (2-(4-carboxyhexafluorobutanoyl-oxy-) ethyl methalcrylic acid), referred to hereinafter as PCHFEM.

The electrolytically active alkali metal ion is preferably lithium or sodium and is most preferably lithium. The lithium salts of the abovementioned anions of PMBA and of PCHFEM may not, in themselves, be useful as electrolytes in an electrochemical cell because of inappropriate mechanical properties. In such cases, it may be necessary to blend the salt with another material to produce appropriate mechanical properties for the above purpose. Thus, each of the abovementioned Li salts may be blended with a polymer such as poly (ethylene oxide) to provide an electrolyte for use in the invention.

PMBA and PCHFEM may be made by methods known in the art and the cell of the invention may be fabricated by methods known in the art. Furthermore, the electrodes in the cell may be constituted by materials known in the art for this purpose, for example the anode may be made of Li or an alloy thereof and the cathode by an intercalation compound such as $TiS_2$.

Several ways of carrying out the invention will be described in detail below by way of example only.

EXAMPLE 1

(i) Preparation of PMBA

Methacryloyl chloride was reacted with p-hydroxy benzoic acid that had been neutralised with NaOH solution to give sodium methacryloyl-oxy-benzoate in about 50% yield. Treatment with hydrochloric acid gave methacryloyl-oxy-benzoic acid which was purified by re-crystallisation from glacial acetic acid, ethanol and acetone respectively. The acid was polymerised at 90° C. in dimethyl formamide solution in a sealed degassed ampoule using benzoyl peroxide as initiator. This gave PMBA which was separated from residual monomer by dissolving the latter in diethyl ether.

(ii) Preparation of Electrolyte

The PMBA was neutralised with LiOH and 75% by weight of poly (ethylene oxide) in a methanol/water solution added. The solvents were removed under vacuum at 130° C.

(iii) Properties of Electrolyte

A differential scanning calorimetric investigation of the electrolyte showed a reduction in crystallite size and a decrease in the degree of crystallinity of the poly (ethylene oxide). This may be due to interaction between $Li^+$ ions and the ether-oxygen atoms along the poly (ethylene oxide) chains. A possible structure of the electrolyte is therefore:

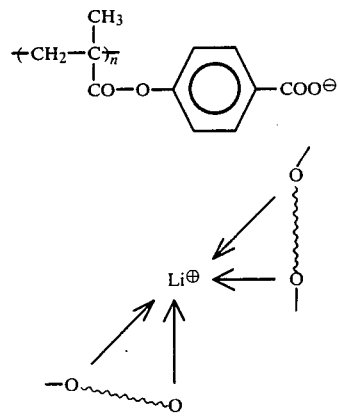

Conductivity measurements as a function of frequency were carried out using a frequency response analyser. A value of ca. $3 \times 10^{-5}$ $\Omega^{-1}cm^{-1}$ was observed at 93° C.

EXAMPLE 2

(i) Preparation of PCHFEM

An excess of hexafluoroglutaric anhydride was reacted with dried 2-hydroxy ethyl methacrylate. The excess was removed by vacuum distillation at ca. 50° C. The resulting acid was polymerised at 90° C. in ethyl acetate in a sealed degassed ampoule using benzoyl peroxide as initiator.

(ii) Preparation of Electrolyte

The PCHFEM was neutralised with LiOMe in ethyl acetate to give the Li salt thereof (PCHFEM-Li). An appropriate amount of poly(ethylene oxide) was added, so that the ratio of ether oxygens in the poly (ethylene oxide) to $Li^+$ ions of the PCHFEM-Li was $O/Li^+ = 18$. The solvent was removed by evaporation and by heating under vacuum at 130° C.

The ionic conductivity at 100° C. of the final product was found to be $\sim 10^{-5} - 1\Omega^{-1}$ using the method as in Example 1.

I claim:

1. A solid state electrochemical cell comprising an anode having at least one alkali metal as its active material, a cathode, and an electrolyte comprising a salt the anion of which salt is a polymer wherein an anionic group is covalently bonded to the polymer chain and is thereby at least partially immobilised, and the cation of which salt is an electrochemically active ion of at least one alkali metal.

2. A solid state electrochemical cell as claimed in claim 1 wherein the electrochemically active alkali metal ion is lithium.

3. A solid state electrochemical cell as claimed in claim 1 wherein the anion constitutes part of the chain of poly (methacryloyl-oxy-benzoate).

4. A solid state electrochemical cell as claimed in claim 3 wherein the electrolyte is blended with poly (ethylene oxide).

5. A solid state electrochemical cell as claimed in claim 1 wherein the anion constitutes part of the chain of poly (2-(4-carboxyhexafluorobutanoyl-oxy-) ethyl methacrylate).

6. A solid state electrochemical cell as claimed in claim 5 wherein the electrolyte is blended with poly (ethylene oxide).

* * * * *